United States Patent
Yu (10) Patent No.: US 11,636,573 B2
(45) Date of Patent: Apr. 25, 2023

(54) IMAGE PROCESSING METHOD AND IMAGE PROCESSING DEVICE

(71) Applicant: Realtek Semiconductor Corporation, Hsinchu (TW)

(72) Inventor: Chung-Ping Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 335 days.

(21) Appl. No.: 17/111,761

(22) Filed: Dec. 4, 2020

(65) Prior Publication Data

US 2021/0327022 A1 Oct. 21, 2021

(30) Foreign Application Priority Data

Apr. 16, 2020 (TW) .................................. 109112802

(51) Int. Cl.
| | |
|---|---|
| *H04N 19/192* | (2014.01) |
| *G06T 3/40* | (2006.01) |
| *H04N 19/513* | (2014.01) |
| *H04N 19/137* | (2014.01) |
| *H04N 19/176* | (2014.01) |
| *H04N 19/119* | (2014.01) |
| *H04N 19/105* | (2014.01) |

(52) U.S. Cl.
CPC ............. *G06T 3/40* (2013.01); *H04N 19/105* (2014.11); *H04N 19/119* (2014.11); *H04N 19/137* (2014.11); *H04N 19/176* (2014.11); *H04N 19/192* (2014.11); *H04N 19/513* (2014.11)

(58) Field of Classification Search
None
See application file for complete search history.

(56) References Cited

U.S. PATENT DOCUMENTS

| | | | |
|---|---|---|---|
| 5,801,778 A | 9/1998 | Ju | |
| 8,934,544 B1 | 1/2015 | Wang | |
| 2004/0046891 A1 | 3/2004 | Mishima et al. | |
| 2006/0125956 A1* | 6/2006 | Lee ...................... | H04N 19/577 |
| | | | 348/452 |

(Continued)

FOREIGN PATENT DOCUMENTS

CN 102918839 A 2/2013

*Primary Examiner* — Christopher G Findley
(74) *Attorney, Agent, or Firm* — Locke Lord LLP; Tim Tingkang Xia, Esq.

(57) ABSTRACT

An image processing method includes: downsizing a current frame and a reference frame; dividing the down-sized current frame and the down-sized reference frame into multiple first current blocks and multiple first reference blocks, respectively; performing a first motion estimation to the first current blocks and the first reference blocks to generate multiple first motion vectors; dividing the current picture and the reference picture into multiple second current blocks and multiple second reference blocks, respectively; performing a second motion estimation to the second current blocks and the second reference blocks to generate multiple second motion vectors; and generating a compensated frame between the current frame and the reference frame according to the second motion vectors. The second motion estimation includes: performing a 3D recursive search for each second current block; and adjusting multiple estimation parameters in the 3D recursive search according to the first motion vector.

10 Claims, 7 Drawing Sheets

(56) References Cited

U.S. PATENT DOCUMENTS

2010/0080295 A1* 4/2010 Panusopone ........... H04N 19/51
                                                    375/240.16
2013/0279590 A1* 10/2013 Chen .................... H04N 19/513
                                                    375/240.16
2014/0327818 A1* 11/2014 Wu ........................ H04N 7/014
                                                    348/441

* cited by examiner

IMAGE PROCESSING METHOD AND IMAGE PROCESSING DEVICE

CROSS-REFERENCE TO RELATED APPLICATION

This application claims priority to Taiwan Application Serial Number 109112802, filed Apr. 16, 2020, which is herein incorporated by reference in its entirety.

BACKGROUND

Technical Field

The present disclosure relates to an image processing method and an image processing device. More particularly, the present disclosure relates to an image processing method and an image processing device that improves the estimation of the motion vector.

Description of Related Art

In the field of image processing, when a frame rate conversion (FRC) is performed, it may first calculate motion vectors through a motion estimation (ME) process and continue by handing over to a motion compensation (MC) process in order to generate an interpolated frame between two original frames. This conversion may create smoother video streams.

However, when the frames are refreshed in a very high speed, or when the speed of calculation is limited by the hardware cost, it may cause broken images, edge shaking, or judder. Therefore, in a motion vector estimation approach, how to balance calculation cost and accuracy is an important issue in the field.

SUMMARY

The present disclosure provides an image processing method. The method comprises: scaling down a current frame and a reference frame; dividing the down-sized current picture into a plurality of first current blocks; dividing the down-sized reference frame into a plurality of first reference blocks; performing a first motion estimation to the plurality of first current blocks and the plurality of first reference blocks to generate a plurality of first motion vectors each corresponding to one of the first current blocks; dividing the current frame into a plurality of second current blocks; dividing the reference frame into a plurality of second reference blocks; performing a second motion estimation to the plurality of second current blocks and the plurality of second reference blocks to generate a plurality of second motion vectors each corresponding to one of the second current blocks; and generating a compensated frame between the current frame and the reference frame according to the plurality of second motion vectors. The second motion estimation comprises: performing a 3D recursive search for each of the plurality of second current blocks; and adjusting a plurality of estimation parameters in the 3D recursive search according to the first motion vectors.

The present disclosure provides an image processing device. The image processing device comprises a motion estimation processor and a motion compensation frame rate converter. The motion estimation processor is configured to perform the following operations: downsize a current frame and a reference frame; dividing the down-sized current frame into a plurality of first current blocks; dividing the down-sized reference frame into a plurality of first reference blocks; performing a first motion estimation to the plurality of first current blocks and the plurality of first reference blocks to generate a plurality of first motion vectors each corresponding to one of the first current blocks; dividing the current frame into a plurality of second current blocks; dividing the reference frame into a plurality of second reference blocks; performing a second motion estimation to the plurality of second current blocks and the plurality of second reference blocks to generate a plurality of second motion vectors each corresponding to one of the second current blocks. In the second motion estimation, the motion estimation processor is configured to: perform a 3D recursive search for each of the plurality of second current blocks; and adjust a plurality of estimation parameters in the 3D recursive search according to the first motion vectors. The motion compensation frame rate converter is coupled to the motion estimation processor and configured to generate a compensated frame between the current frame and the reference frame according to the plurality of second motion vectors.

In summary, the motion estimation processor of the image processing device performs motion estimation according to the image processing method, so that the efficiency and accuracy of obtaining the motion vectors can be improved. Therefore, under the condition of maintaining or reducing the computing cost, it can effectively reduce the image broken, edge shaking or judder.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the present disclosure, examples of which are illustrated in the accompanying drawings. Wherever possible, the same reference numbers are used in the drawings and the description to refer to the same or like parts.

Figure 1:
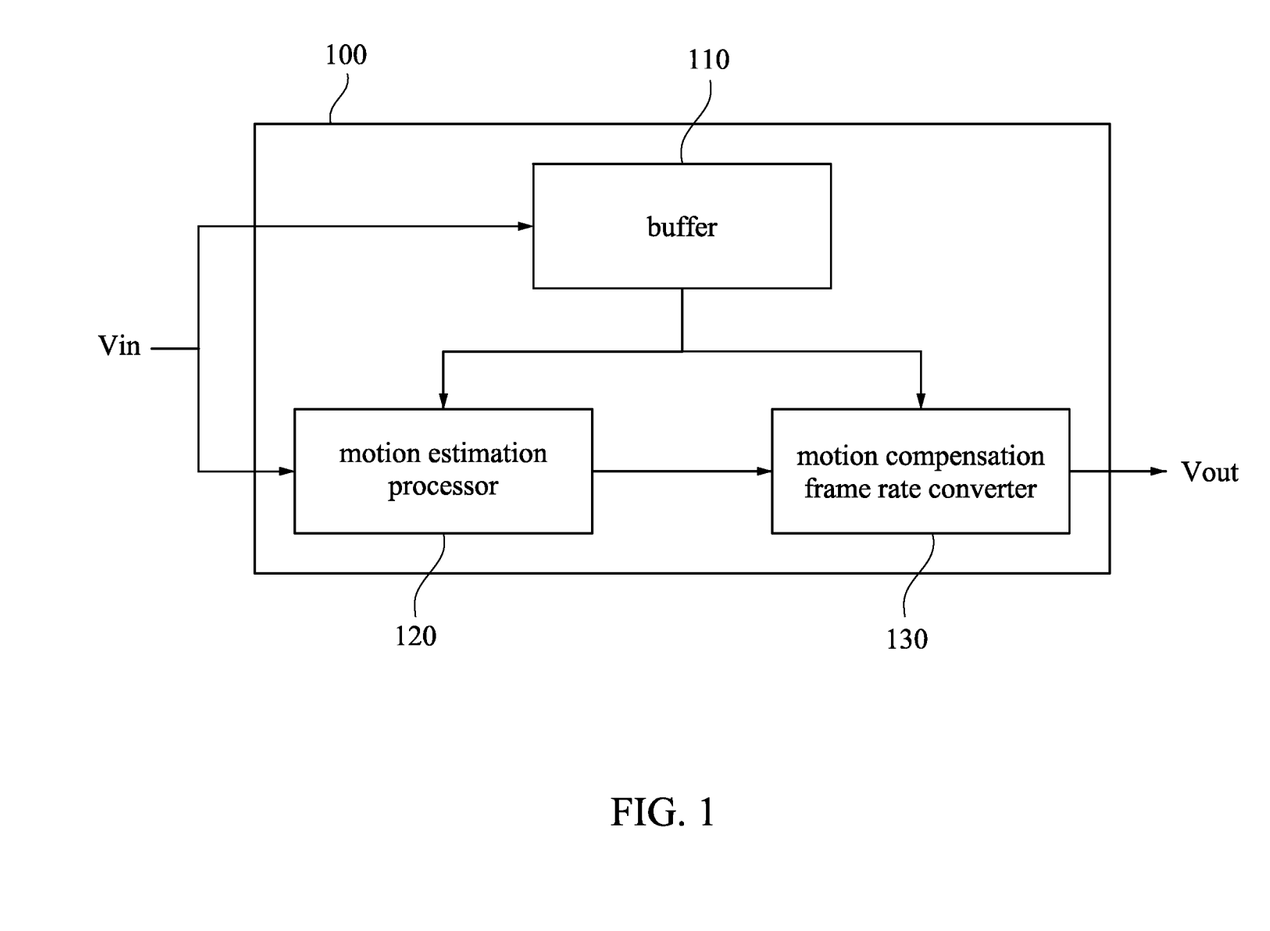
FIG. 1 is a schematic diagram of an image processing device according to an embodiment of the present disclosure.

Reference is made to FIG. 1. FIG. 1 is a schematic diagram of an image processing device 100 according to an embodiment of the present disclosure. As shown in FIG. 1, the image processing device 100 includes a buffer 110, a motion estimation processor 120 and a motion compensation frame rate converter 130. A possible configuration may be the buffer 110 connected to the motion estimation processor 120 and the motion compensation frame rate converter 130.

In view of operation, the buffer 110 is configured to receive the image input signal Vin to perform buffering processing, and transmit the processed image input signal Vin to the motion estimation processor 120 and/or the motion compensation frame rate converter 130. The motion estimation processor 120 is configured to receive the image input signal Vin and perform a motion estimation (ME) process and then transmit the corresponding signal to the motion compensation frame rate converter 130. The motion compensation frame rate converter 130 is configured to perform a frame interpolation compensation process according to the received signal, and outputting an image output signal Vout after the frame rate conversion is done.

Figure 2:
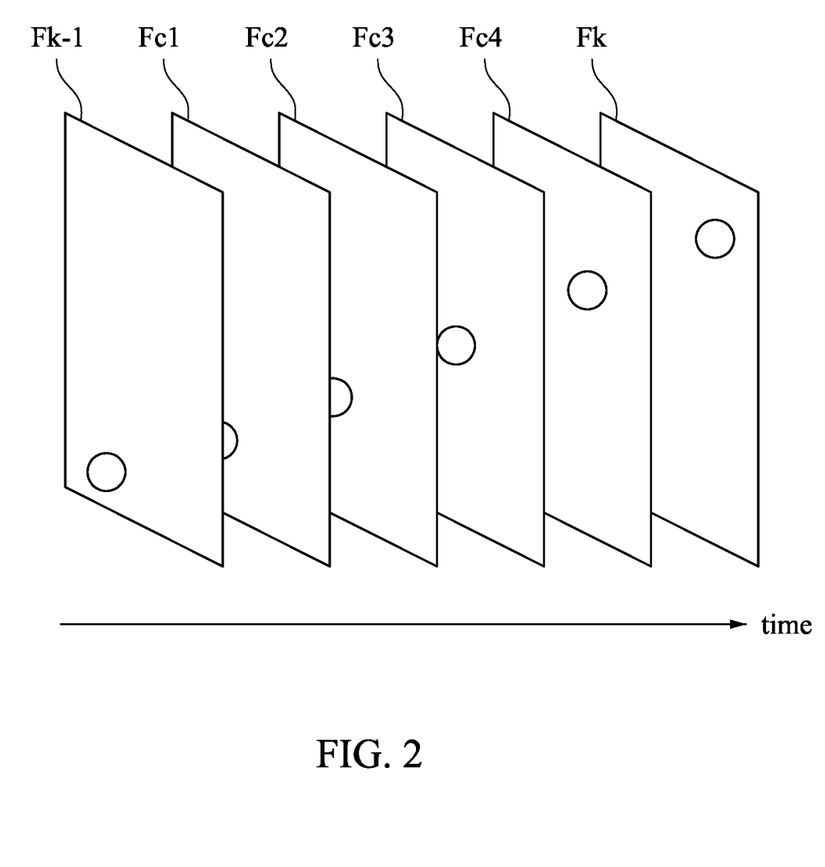
FIG. 2 is a schematic diagram of continuous frames included in an image according to an embodiment of the present disclosure.

For example, as shown in FIG. 2, a frame Fk−1 and a frame Fk may be two adjacent frames of the image input signal Vin received by the image processing device 100. The motion estimation processor 120 may divide each of the frame Fk−1 and the frame Fk into multiple blocks, in which each block is defined by a length i and a width j. The motion estimation processor 120 may apply 3D recursive search to find out a best motion vector for each block and transmit the best motion vector to the motion compensation frame rate converter 130.

In further detail, when each time a scan is performed, the motion estimation processor 120 generates various motion vector candidates (e.g., zero vector, spatial vector, temporal vector, and global vector, etc.) in a search window for each block of the entire frame according to features of various frame changes and calculates a matching degree for each motion vector candidate. The one with the highest matching degree may be selected as the motion vector of this block. Next, the motion estimation processor 120 adds a random vector to the motion vector of each block obtained in each scan in order to retrieve an initial vector for the next scan. In this way, by applying multiple scans, the best motion vector of each block may be converged.

After that, the motion compensation frame rate converter 130 generates a compensated frame between the frame Fk−1 and the frame Fk according to the frame Fk−1, the frame Fk, and the best motion vector of each block. For example, in a case that the best motion vector may be substantially described as a vector directing from the bottom left to the top right of the frame, focusing on the circle located at the bottom left corner of the frame Fk−1 and the same circle located at the top right corner of the frame Fk, the compensated frames may be shown as frames from Fc1-Fc4. In other words, the image output signal Vout output by the image processing device 100 using this image processing method may include the frame Fk−1, the frames Fc1-Fc4, and the frame Fk.

It is noted that a short step of the random vector may require more times of scan to reach the matched block but an overly long step of the random vector may cause a convergence failure on the result. In addition, when the content in the frame changes in a very fast speed, increasing the step of the random vector may not necessarily result in a motion vector convergence. Therefore, the present disclosure proposes the following image processing method to improve the convergence speed and accuracy of motion vector estimation.

Figure 3:
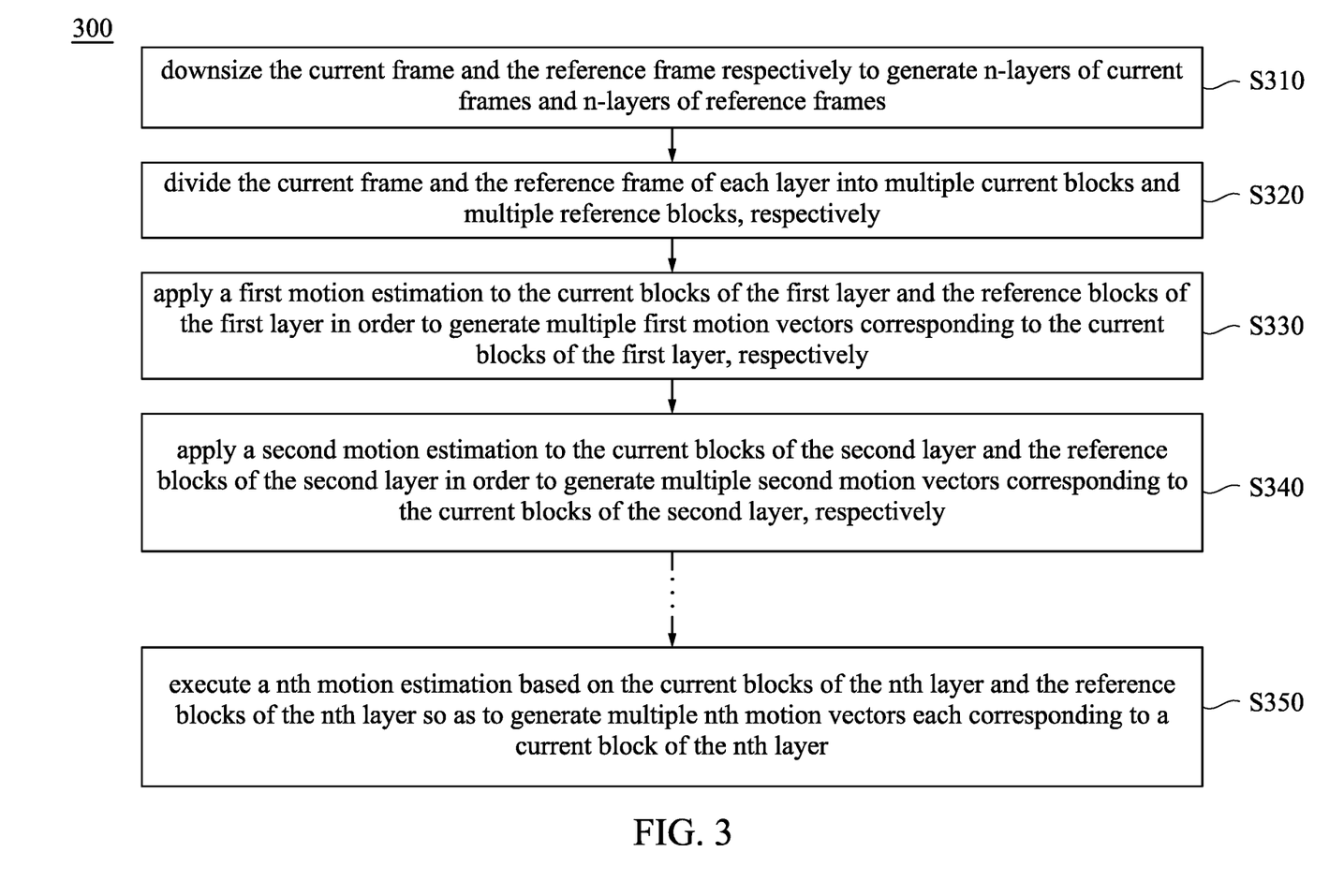
FIG. 3 is a flowchart of an image processing method according to an embodiment of the present disclosure.

Please refer to FIG. 3. FIG. 3 is a flowchart of an image processing method 300 according to an embodiment of the present disclosure. For better understanding, the following image processing method 300 is described in conjunction with the embodiments shown in FIGS. 1-7, but not limited thereto. Person familiar with this technique can make various changes and modifications to thereof without departing from the spirit and scope of the present disclosure. As shown in FIG. 3, the image processing method 300 includes operations S310, S320, S330, S340, and S350.

Figure 4:
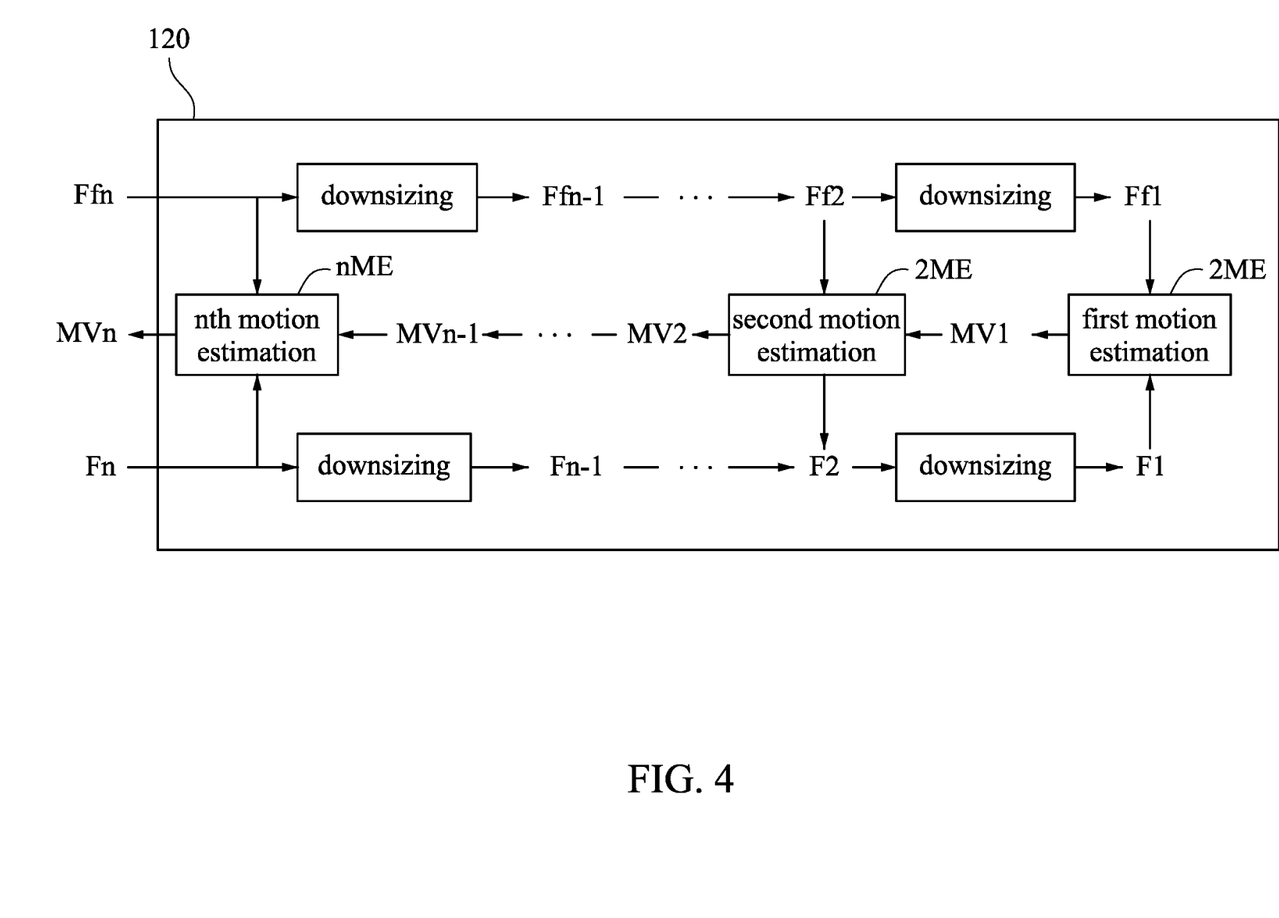
FIG. 4 is a functional block diagram of a motion estimation processor according to an embodiment of the present disclosure.
Figure 5:
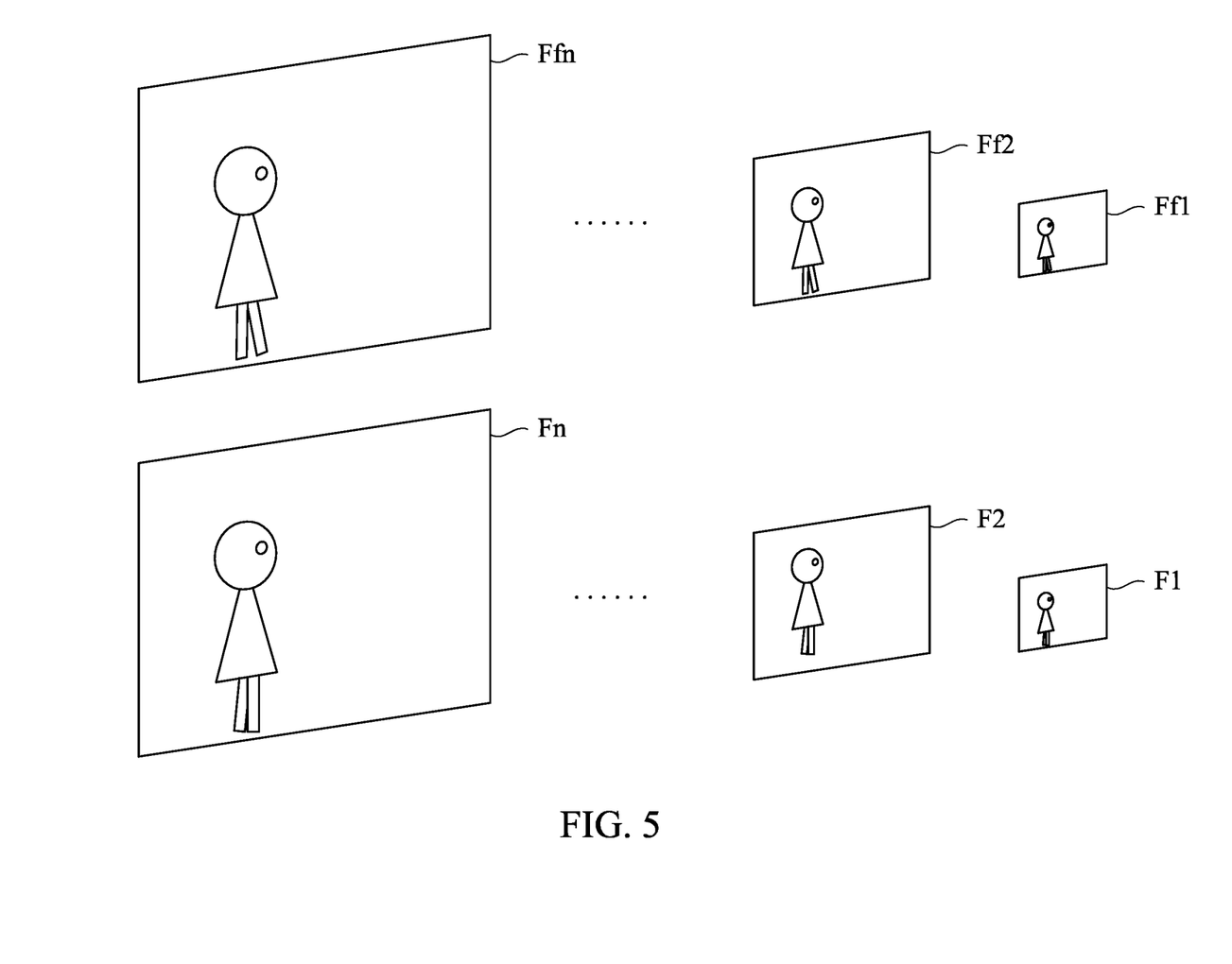
FIG. 5 is a schematic diagram of downsizing the image according to an embodiment of the present disclosure.

First, in the operation S310, the current frame and the reference frame may be downsized respectively to generate n-layers of current frames and n-layers of reference frames. Specifically, as shown in FIGS. 4 and 5, a frame Fn is a current frame in the image input signal Vin received by the image processing device 100 and a frame Ffn is a reference frame corresponding to the frame Fn. A size reduction process are applied to each of the frame Fn and the frame Ffn to form a frame Fn−1 and a frame Ffn−1a. In the same manner, (n−1) times of size reduction processes are applied to the frame Fn and the frame Ffn to form the frame F1 and the frame Ff1, respectively. For example, the ratio of the size reduction process can be, but not limited to, ½ or ¼. In addition, as shown in FIG. 5, the reference frame (i.e. Ffn) and the current frame Fn can be two adjacent frames in the image input signal Vin, but the present disclosure is not limited thereto.

Next, in operation S320, the current frame and the reference frame of each layer are divided into multiple current blocks and multiple reference blocks, respectively. Specifically, the current frame F1 of a first layer is divided into multiple first current blocks and the reference frame Ff1 of the first layer is divided into a multiple first reference blocks. The current frame F2 of a second layer is divided into multiple second current blocks and the reference frame Ff2 of the second layer is divided into multiple second reference blocks. In the same manner, the current frame Fn of a nth layer is divided into multiple nth current blocks and the reference frame Ffn of the nth layer is divided into multiple nth reference blocks.

Next, in operation S330, a first motion estimation is applied to the current blocks of the first layer and the reference blocks of the first layer in order to generate multiple first motion vectors corresponding to the current blocks of the first layer, respectively. Specifically, as shown in FIG. 4, a first motion estimation 1ME is applied to the current blocks of frame F1 and the reference blocks of frame Ff1 to generate first motion vectors MV1.

Figure 6:
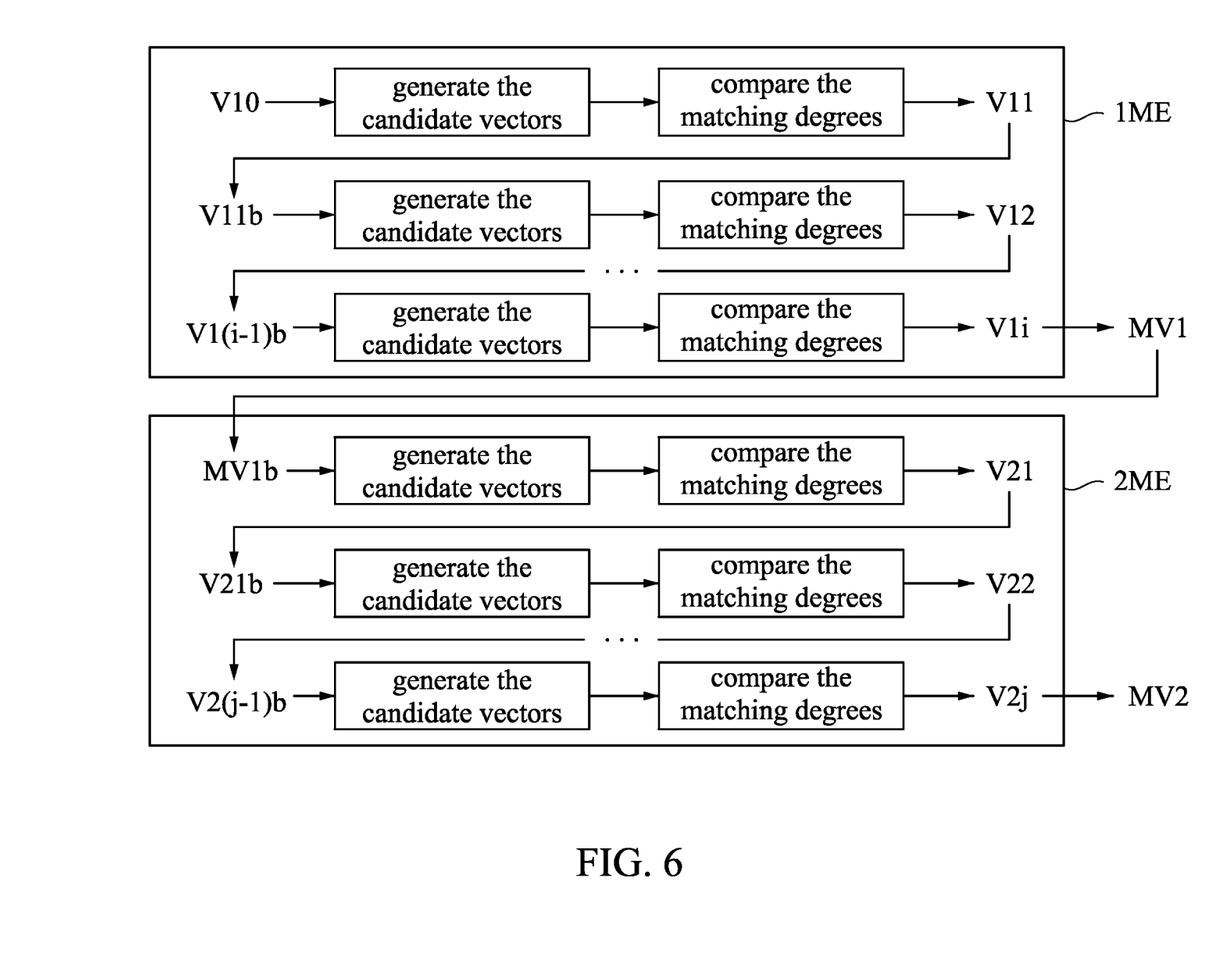
FIG. 6 is a functional block diagram of a first and second motion estimation according to an embodiment of the present disclosure.

For example, as shown in FIG. 6, a 3D recursive search can be performed in the first motion estimation 1ME to gain convergence results of the first motion vectors MV1 through multiple scans. In the first scan, multiple candidate vectors for each current block are generated in a search window corresponding to the current block according to the initial vectors V10, and matching degrees of these candidate vectors are calculated and compared with each other. The candidate vectors with the highest matching degree are selected as matching vectors V11 corresponding to the current blocks. Next, in the second scan, the matching vectors V11 are adjusted to be new initial vectors V11b for calculation of this scan so as to generate new matching vectors V12. In the same manner, the convergence results, matching vectors V1i, after i times of scans can be defined as the first motion vectors MV1. In some embodiments, the calculation of the matching degree can be implemented by using sum of absolute differences (SAD), but the present disclosure is not limited thereto.

Next, in operation S340, a second motion estimation is applied to the current blocks of the second layer and the reference blocks of the second layer in order to generate multiple second motion vectors corresponding to the current blocks of the second layer, respectively. The estimation parameters of the second motion estimation can be adjusted according to the first motion vectors of the first layer frames. Specifically, as shown in FIG. 4, a second motion estimation 2ME is applied to the current blocks of frame F2 and the reference blocks of frame Ff2 to generate the second motion vectors MV2, in which the estimation parameters of the second motion estimation 2ME are adjusted according to the first motion vectors MV1.

For example, as shown in FIG. 6, similar to the first motion estimation 1ME, the second motion estimation 2ME can also use the 3D recursive search to gain convergence results of the second motion vectors MV2 through multiple scans. Additionally, in the second motion estimation 2ME, the estimation parameters (e.g., the direction and step of the random vector, the punishment for the candidate vector, and the size of the search window) can be adjusted according to the first motion vectors MV1.

Figure 7:
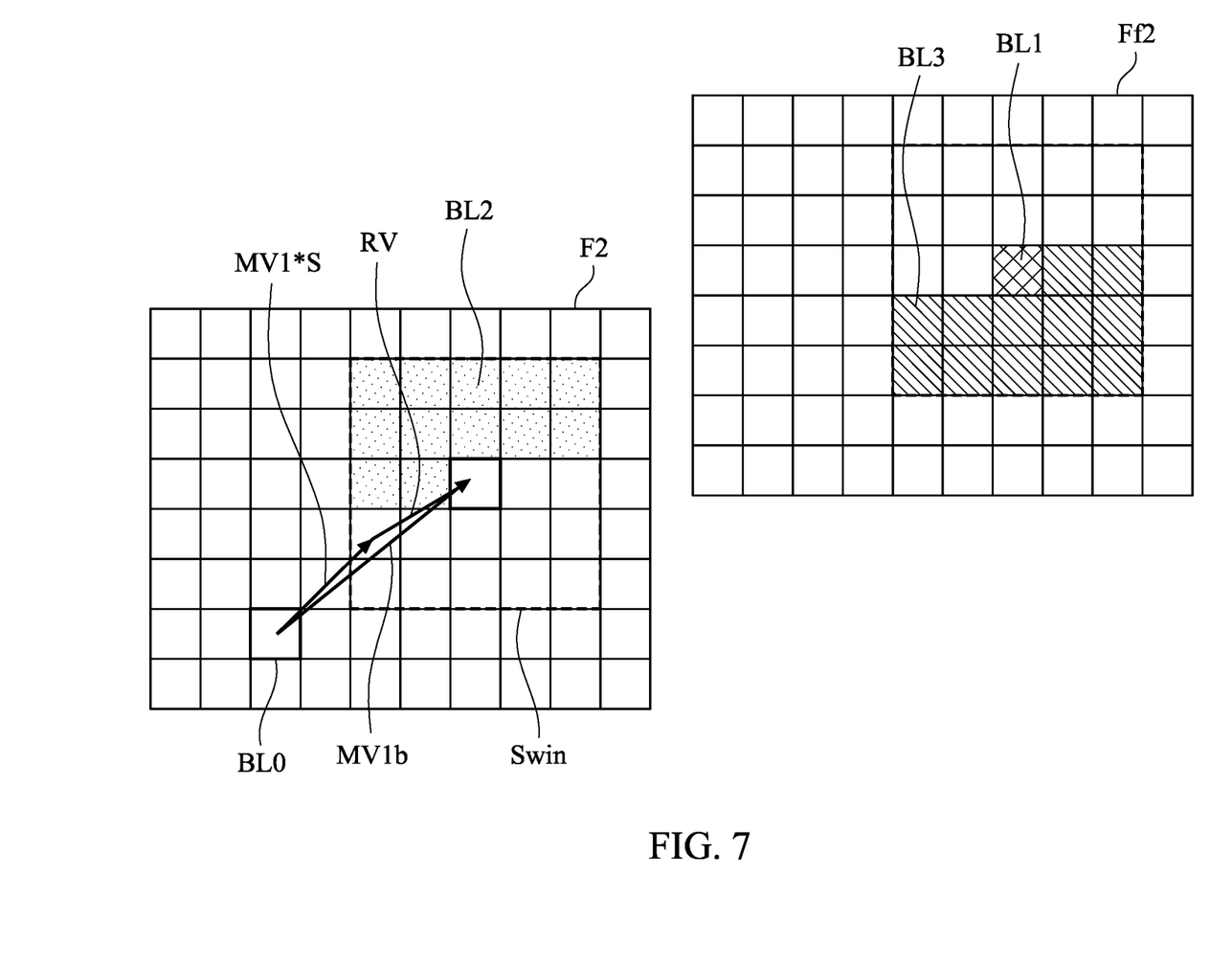
FIG. 7 is a schematic diagram of a search window and candidate vectors according to an embodiment of the present disclosure.

In detail, as shown in FIG. 7, in each scan of the second motion estimation 2ME, each current block of the current frame F2 is calculated based on a direction from the frame's top to the bottom and another direction from the frame's left to the right so that the matching vector of each current block can be obtained. Taking a current block BL0 of the current frame F2 as an example, in some embodiments of the second motion estimation 2ME, as shown in the following equation (1) the initial vector for the first scan of the current block BL0 can be retrieved by multiplying the motion vector MV1 by a ratio (e.g., the vector MV1×S in FIG. 7) and aggregating with a random vector RV. For the sake of understanding, in the following description, a term "target vector" is used to represent the motion vector MV1 multiplied by the ratio. That is, the target vector is generated by multiplying the first motion vector of the first current block which corresponds to one of the second current blocks by the ratio.

$$n \text{ layer } MV = n-1 \text{ layer } MV \times \text{scale} + \text{random step} \quad \text{equation (1)}$$

Next, based on the features of different frame changes, multiple candidate vectors can be generated in the search window Swin corresponding to each block. The matching degrees between the block BL0 and each of the multiple candidate blocks pointed to by the multiple candidate vectors are calculated. The candidate vector with the highest matching degree is used as the motion vector of the block BL0.

In this way, the motion vector MV1 obtained from the upper layer frame is used as the reference of the initial vector for the motion estimation of the current layer frame. Compared with an approach using a zero vector or simply a random vector as the initial vector, the present disclosure requires fewer scans to retrieve the convergence result of the motion vector MV2. It is noted that the random vector RV can be adjusted according to the step of the motion vector MV1. When the step of the motion vector MV1 is longer, the step of the random vector RV may be longer.

For another example, as shown in the following equation (2), when the second motion estimation 2ME is performed, a vector difference between a value of the motion vector MV1 multiplied by the ratio (e.g., the vector MV1×S in FIG. 7) and another value of the motion vector (e.g., the vector V21 in FIG. 6) corresponding to the second layer frame can be calculated. In other words, the vector difference is a difference between the target vector and the motion vector of the second layer frame. Further, according to a comparison of the target vector and the motion vector of the second layer frame, it is decided whether to add the vector difference of the motion vector to (or subtract from) the second layer frame in order to generate the initial vector for the next scan (e.g., the vector V21$b$ in the FIG. 6).

$$\Delta MV = |(n-1 \text{ layer } MV \times \text{scaler} - n \text{ layer } MV)|$$

If $\min(n-1 \text{ layer } MV \times \text{scaler}, n \text{ layer } MV) == n \text{ layer } MV$ $n$ layer $MV = n$ layer $MV + \Delta MV + \text{random step}$ Else $n$ layer $MV = n$ layer $MV - \Delta MV + \text{random step} \quad \text{equation (2)}$ Similarly, as shown in the following equation (3), the vector difference between the motion vector of the second layer frame (e.g., the vector V21 in FIG. 6) and the motion vector MV1 multiplied by the ratio (e.g., the vector MV1×S in FIG. 7) can be further divided by a coefficient. The quotient can be used to adjust the vector difference to generate the weight of the initial vector (e.g., the vector V21$b$ in FIG. 6) for the next scan. The larger the coefficient, more likely the convergence result of the motion vector MV2 approaches the motion vector of the second layer frame. The smaller the coefficient, more likely the convergence result of the motion vector MV2 approaches the reference motion vector MV1.

$$\Delta MV = |(n-1 \text{ layer } MV \times \text{scaler} - n \text{ layer } MV)|/\text{distance coefficient}$$

If $\min (n-1 \text{ layer } MV \times \text{scaler}, n \text{ layer } MV) == n \text{ layer } MV$ $n$ layer $MV = n$ layer $MV + \Delta MV + \text{random step}$ Else $n$ layer $MV = n$ layer $MV - \Delta MV + \text{random step} \quad \text{equation (3)}$ In this way, by adjusting the direction and step of the random vectors for the motion estimation of the current layer based on the motion vectors of the previous layer, a reference of the convergence direction and the convergence range of the motion estimation of the current layer can be provided. Compared with a case using unrestricted random vectors, the above embodiment provides an improved the efficiency of convergence calculation and avoids unnecessary calculation cost caused by random numbers.

Regarding an embodiment in which the estimation parameters may include a punishment for the candidate vectors, the current block BL0 in FIG. 7 is used as an example for description. In this embodiment, the candidate blocks pointed to by the candidate vectors include blocks BL1, BL2, BL3, and so on. The zero candidate vector corresponds to the block BL1 which located at the same position in the reference frame Ff2. The spatial candidate vector corresponds to the block BL2 substantially located around the upper right region in the current frame F2. The temporal candidate vector corresponds to the block BL3 substantially located around the lower right region in the reference frame Ff2 of the previous frame. In addition, the global candidate vector corresponds to a block (not shown in the figure) obtained based on the global vector MVf of the reference frame Ff2 of the previous frame.

It is noted that the candidate blocks shown in FIG. 7 is only an example for understanding, and is not intended to limit the present disclosure. In some other embodiments, the candidate blocks and candidate vectors may not be limited to the types described above, and the quantity of them may be determined based on the amount of calculation that can be achieved by the actual hardware. For example, the search window Swin is not limited to a 5×5 region, but can be a 3×3 region.

As shown in the following equation (4), when the second motion estimation 2ME is performed, the spatial vectors in the candidate vectors of all blocks in frame F2 can be compared with the motion vectors MV1 of the corresponding blocks to calculate the spatial vector differences. In other words, the motion vectors MV1 are used as a reference to evaluate the trusting degrees of the spatial candidate vectors of the frame F2. Similarly, the temporal vectors in the candidate vectors of all the blocks in the frame F2 is compared with the motion vectors MV1 of the corresponding blocks to calculate the temporal vector differences. The motion vectors MV1 are used as a reference to evaluate the trusting degrees of the temporal candidate vectors of the frame F2. The candidate vectors with larger vector difference (corresponding to lower trusting degree) are punished. The punishment can be applied to filter and get the motion vector with certain characteristics having higher reference potential so that the convergence calculation can be accelerated. In some embodiments, punishing candidate vectors can be understood as a mechanism for evaluating scores of the candidate vectors. Establishing a punishment on a candidate vector can be achieved by increasing the punishing score of the candidate vector to reduce the matching degree of the candidate vector. When the punishing score of this candidate vector is greater than the punishing scores of other candidate vectors, the matching degree of this candidate vector is lower than those of the other candidate vectors so that this candidate vector has a lower probability of being selected as the matching vector than the other candidate vectors.

$\Sigma$Different value (n layer spatial MV, n−1 layer MV)

$\Sigma$Different value (n layer temporal MV, n−1 layer MV)

Calculate all of different value

Punish [n layer candidate with max (different value)]   equation (4)

Alternatively, as shown in the following equation (5), in some embodiments, correlation degrees between the motion vector MV1 of each block in the frame F2 and the motion vector MV1 of its surrounding blocks can be calculated. If the correlation degrees corresponding to the blocks in a specific partial region are greater than a preset correlation degree threshold and the mentioned spatial vector differences corresponding to the blocks in this partial region are also greater than a preset vector difference threshold (indicating that the spatial trusting degrees are lower than a preset trusting degree threshold), the spatial candidate vectors in this partial region of the frame F2 are punished.

Calculate n−1 MV and it neighbors' relation

If (this region is relation high) AND [Different value (n layer spatial MV, n−1 layer MV) is high]

Punish this n layer spatial MV   equation (5)

Similarly, as shown in the following equation (6), in some embodiments, correlation degrees between the motion vectors MV1 of each block in the frame F2 and the motion vector MV1 of its surrounding blocks can be calculated. If the correlation degrees corresponding to the blocks in a specific partial region are high and the mentioned temporal vector differences corresponding to the blocks in this partial region are also high (indicating a low temporal trusting degree), the temporal candidate vectors in this partial region of frame F2 are punished.

Calculate n−1 MV and it neighbors' relation

If (this region is relation high) AND [Different value (n layer temporal MV, n−1 layer MV) is high]

Punish this n layer temporal MV   equation (6)

In addition, as shown in the following equation (7), an approach may be applied by grouping the motion vectors of all the blocks in the frame F2 into a histogram. If some spatial vector in a region of the same group show high spatial vector differences (indicating a low spatial trusting degree), these spatial candidate vectors corresponding to the blocks in the region of the same group in the frame F2 are punished. If certain temporal vector corresponding to the blocks in the region of the same group show high temporal vector differences (indicating a low temporal trusting degree), these temporal candidate vectors corresponding to the blocks in the region of the same group in the frame F2 are punished.

Calculate n−1 MV and it histogram list

If (this histogram of group is high) AND [Different value (n layer spatial MV, n−1 layer MV) is high]

Punish this n layer spatial MV

If (this histogram of group is high) AND [Different value (n layer temporal MV, n−1 layer MV) is high]

Punish this n layer temporal MV   equation (7)

In other words, when executing the candidate vector selection corresponding to the current layer (e.g., the frame F2), the statistical data of the motion vectors (e.g., the motion vectors MV1 in the frame F1) of the previous layer can be compared in order to eliminate untrustworthy candidate vectors from the entire frame, partial regions or partial groups. This approach can improve the efficiency of finding the convergence results.

It is noted that the foregoing embodiment describes whether to punish certain candidate vectors simply based on the calculation results. However, in other embodiments, different weights can be introduced to implement the punishments according to the vector differences (i.e., the trusting degree).

Furthermore, the estimation parameters may include the size of the search window. As shown in the following equation (8), the spatial correlation degrees of the motion vectors MV1 corresponding to each block in the frame F2 and the blocks distributed around (i.e., the upper, lower, left, and right) that block are calculated. The spatial correlation degrees between each block and its surrounding blocks can be compared in order to flag the blocks with lower spatial correlation degrees. The flagged blocks with spatial correlation degrees lower than a preset threshold can be punished. Alternatively, the region where the flagged blocks belong can be punished with different weights according to the spatial correlation degree. Alternatively, a larger search window can be provided to the blocks with higher spatial correlation degrees, and the regions including flagged blocks with lower spatial correlation degrees can be divided into smaller search windows.

Calculate n−1 MV and it spatial (Top/Bottom/Left/
Right/Left Top/Left Bottom/Right Top/Right
Bottom) relation If compare (this region's relation, neighbors' relation) is different, flag this region Punish this n layer MV if flag is true          equation (8)

In this way, by flagging blocks with the spatial correlation degree, the boundary of the object in the frame can be determined according to the flagged position, and the motion estimation of the partial region can be improved with the punishments or the search window division.

In the same manner, the motion vectors generated in the calculation of each layer can be used to adjust the estimation parameters of the motion estimation for the calculation of the next layer. In operation S350, a nth motion estimation is executed based on the current blocks of the nth layer and the reference blocks of the nth layer so as to generate multiple nth motion vectors each corresponding to a current block of the nth layer. The estimation parameters of the nth motion estimation can be adjusted according to the (n−1)th motion vectors of the (n−1)th layer frame. In particular, as shown in FIG. 4, the (n−1)th motion vectors MVn−1 are generated after (n−1) times of motion estimations. The nth motion estimation nME is executed based on on the current blocks of the frame Fn and the references block of the frame Ffn in order to generate the nth motion vectors MVn, where the estimation parameters of the nth motion estimation nME are adjusted according to the (n−1)th motion vectors MVn−1.

In this way, the motion vectors obtained by the downsized upper layer frame is used as a reference for motion estimation of the current layer frame, which can effectively reduce the calculation workload and improve the efficiency and accuracy of finding the convergence results.

It is noted that FIGS. 3-5 illustrate (n−1) times of downsizing and n-times of motion estimations, where (n−1) is a positive integer. In addition, FIG. 6 shows (i−1) times of scans and (j−1) times of scans, where (i−1) and (j−1) are arbitrary positive integers.

In summary, the motion estimation processor 120 of the image processing device 100 can perform motion estimations according to the image processing method 300, which can improve the efficiency and accuracy of obtaining the motion vectors. Therefore, under the condition of maintaining or reducing computation cost, the effect s of image broken, edge shaking or judder can still be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image processing method, comprising:
   downsizing a current frame and a reference frame;
   dividing the down-sized current frame into a plurality of first current blocks;
   dividing the down-sized reference frame into a plurality of first reference blocks;
   performing a first motion estimation to the plurality of first current blocks and the plurality of first reference blocks to generate a plurality of first motion vectors each corresponding to one of the first current blocks;
   dividing the current frame into a plurality of second current blocks;
   dividing the reference frame into a plurality of second reference blocks;
   performing a second motion estimation to the plurality of second current blocks and the plurality of second reference blocks to generate a plurality of second motion vectors each corresponding to one of the second current blocks; and
   generating a compensated frame between the current frame and the reference frame according to the plurality of second motion vectors, wherein the second motion estimation comprises:
   performing a 3D recursive search for each of the plurality of second current blocks; and
   adjusting a plurality of estimation parameters in the 3D recursive search according to the first motion vectors.

2. The image processing method of claim 1, wherein the 3D recursive search comprises a plurality of scans that generates a convergence result to be a matching vector, and the matching vector is the second motion vector of one of the plurality of second current blocks, wherein each scan comprises:
   generating a plurality of candidate vectors according to an initial vector;
   calculating a plurality of matching degrees corresponding to the plurality of candidate vectors;
   selecting the candidate vector with the highest matching degree as the matching vector; and
   using the matching vector as the initial vector for a next scan.

3. The image processing method of claim 2, wherein adjusting the plurality of estimation parameters in the 3D recursive search according to the first motion vectors comprises:
   multiplying the first motion vector of the first current block corresponding to the one of the plurality of second current blocks by a ratio in order to generate a target vector; and
   adding a random vector to the target vector to generate the initial vector for a first scan.

4. The image processing method of claim 3, wherein adjusting the plurality of estimation parameters in the 3D recursive search according to the first motion vectors further comprises:
   in a current scan among the plurality of scans, using the matching vector of a previous scan and a vector difference as weights to determine the initial vector of the current scan, wherein the vector difference is a difference between the matching vector and the target vector and further divided by an adjustment coefficient.

5. The image processing method of claim 2, wherein adjusting the plurality of estimation parameters in the 3D recursive search according to the first motion vectors comprises:
   calculating a spatial vector difference between a spatial vector selected from the candidate vectors corresponding to one of the plurality of second current blocks and the first motion vector of the first current block corresponding to the one of the plurality of second current blocks;

calculating a temporal vector difference between a temporal vector selected from the plurality of candidate vectors corresponding to the one of the plurality of second current blocks and the first motion vector of the first current block corresponding to the one of the plurality of second current blocks;

when the spatial vector difference is greater than the temporal vector difference, reducing the matching degree corresponding to the space vector; and when the temporal vector difference is greater than the spatial vector difference, reducing the matching degree corresponding to the spatial vector.

6. The image processing method of claim 2, wherein adjusting the plurality of estimation parameters in the 3D recursive search according to the first motion vectors comprises:

calculating a first motion vector correlation degree between one of the plurality of second current blocks and a surrounding region of the one of the plurality of second current blocks;

calculating a vector difference between one of the plurality of candidate vectors corresponding to the one of the plurality of second current blocks and the first motion vector of the first current block corresponding to the one of the plurality of second current blocks; and when the first motion vector correlation degree is greater than a correlation degree threshold and the vector difference value is greater than a vector difference threshold value, reducing the matching degree corresponding to the one of the plurality of candidate vectors, wherein the one of the plurality of candidate vectors is a temporal vector or a spatial vector.

7. The image processing method of claim 2, wherein adjusting the plurality of estimation parameters in the 3D recursive search according to the first motion vectors comprises:

grouping the plurality of second current blocks according to the plurality of first motion vectors;

calculating a vector difference between one of the plurality of candidate vectors corresponding to one of the plurality of second current blocks and the first motion vector of the first current block corresponding to the one of the plurality of second current blocks;

when the plurality of vector differences corresponding to the second current blocks that belongs to a group are greater than a vector difference threshold, reducing the plurality of matching degrees corresponding to the candidate vectors of those second current blocks in the group, wherein the plurality of candidate vectors are temporal vectors or spatial vectors.

8. The image processing method of claim 2, wherein adjusting the plurality of estimation parameters in the 3D recursive search according to the first motion vectors comprises:

calculating a first motion vector correlation degree between one of the plurality of second current blocks and a surrounding region of the one of the plurality of second current block;

when the first motion vector correlation degree is lower than a correlation degree threshold, flagging the one of the plurality of second current blocks; and downsizing a search window of the flagged second current block.

9. An image processing device, comprising:

a motion estimation processor configured to perform the following operations:

downsizing a current frame and a reference frame;

dividing the down-sized current frame into a plurality of first current blocks;

dividing the down-sized reference frame into a plurality of first reference blocks;

performing a first motion estimation to the plurality of first current blocks and the plurality of first reference blocks to generate a plurality of first motion vectors each corresponding to one of the first current blocks;

dividing the current frame into a plurality of second current blocks;

dividing the reference frame into a plurality of second reference blocks;

performing a second motion estimation to the plurality of second current blocks and the plurality of second reference blocks to generate a plurality of second motion vectors each corresponding to one of the second current blocks, wherein the second motion estimation comprises:

performing a 3D recursive search for each of the plurality of second current blocks; and adjusting a plurality of estimation parameters in the 3D recursive search according to the first motion vectors;

a motion compensation frame rate converter coupled to the motion estimation processor and configured to generate a compensated frame between the current frame and the reference frame according to the plurality of second motion vectors.

10. The image processing device of claim 9, wherein the 3D recursive search comprises a plurality of scans, the motion estimation processor is configured to generate a matching vector which is a convergence result of the plurality of scans, and the matching vector is the second motion vector of one of the plurality of second current blocks, wherein the motion estimation processor is configured to perform the following in each scan:

generating a plurality of candidate vectors according to an initial vector;

calculating a plurality of matching degrees corresponding to the plurality of candidate vectors;

selecting the candidate vector with the highest matching degree as the matching vector; and using the matching vector as the initial vector for a next scan.

* * * * *